(12) United States Patent
Holmes et al.

(10) Patent No.: US 9,001,729 B2
(45) Date of Patent: Apr. 7, 2015

(54) IP BASED MICROPHONE AND INTERCOM

(75) Inventors: Fred H. Holmes, Cleveland, OK (US);
Kevin C. Baxter, Glendale, CA (US)

(73) Assignee: LP Partners, Inc., Van Nuys, CA (US)

( * ) Notice: Subject to any disclaimer, the term of this patent is extended or adjusted under 35 U.S.C. 154(b) by 0 days.

(21) Appl. No.: 12/874,199

(22) Filed: Sep. 1, 2010

(65) Prior Publication Data

US 2011/0211524 A1    Sep. 1, 2011

Related U.S. Application Data

(60) Provisional application No. 61/238,939, filed on Sep. 1, 2009.

(51) Int. Cl.
*H04W 4/00* (2009.01)
*H04N 7/18* (2006.01)
*H04B 1/20* (2006.01)

(52) U.S. Cl.
CPC ............ *H04N 7/18* (2013.01); *H04B 2203/545* (2013.01); *H04B 1/20* (2013.01)

(58) Field of Classification Search
USPC ............... 370/328; 379/68–70, 72; 375/240.1
See application file for complete search history.

(56) References Cited

U.S. PATENT DOCUMENTS

| | | | |
|---|---|---|---|
| 6,121,754 A * | 9/2000 | Kamperschroer | ............ 320/132 |
| 7,088,832 B1 * | 8/2006 | Cooper | ......................... 381/94.1 |
| 7,359,979 B2 | 4/2008 | Gentle et al. | |
| 7,548,565 B2 | 6/2009 | Sull et al. | |
| 7,564,840 B2 | 7/2009 | Elliott et al. | |
| 8,255,957 B1 * | 8/2012 | Mattox | ............................ 725/63 |
| 2002/0171737 A1 * | 11/2002 | Tullis | ............................. 348/143 |
| 2003/0172797 A1 * | 9/2003 | Juszkiewicz et al. | ............ 84/601 |
| 2004/0107288 A1 * | 6/2004 | Menninger et al. | ............ 709/231 |
| 2005/0105743 A1 * | 5/2005 | Faltesek et al. | .................. 381/82 |
| 2005/0267605 A1 * | 12/2005 | Lee et al. | ......................... 700/19 |
| 2006/0034278 A1 * | 2/2006 | Hundscheidt et al. | ......... 370/390 |
| 2007/0019571 A1 * | 1/2007 | Stogel | ............................ 370/260 |
| 2010/0182930 A1 * | 7/2010 | Gentle et al. | ................... 370/252 |

OTHER PUBLICATIONS

ISA/US PCT International Search Report, International Application No. PCT/US2010/047592, mailed Oct. 29, 2010.

* cited by examiner

*Primary Examiner* — Kwang B Yao
*Assistant Examiner* — Hardikkumar Patel
(74) *Attorney, Agent, or Firm* — Fellers, Snider, Blankenship, Bailey & Tippens, P.C.

(57) ABSTRACT

A transceiver including, a codec, microcontroller, and radio. The codec including an analog to digital converter for receiving a first audio program and converting it to a first digital signal; a digital to analog converter for receiving a second digital audio signal and converting it to a second audio program; and, a control function for managing characteristics of the codec. The microcontroller is in electrical communication with the codec: for receiving the first digital audio signal from the codec and packetizing it into a first packet for transmission over a TCP/IP network; for receiving a second packet from network and converting it into the second digital audio signal and sending it to the codec; and for receiving control signals from the network. The radio is in electrical communication with the microcontroller for connection to the network to transmit the first packet to the network and receive the second packet from the network.

6 Claims, 5 Drawing Sheets

IP BASED MICROPHONE AND INTERCOM

CROSS-REFERENCE TO RELATED CASE

This application claims the benefit of U.S. provisional patent application Ser. No. 61/238,939, filed on Sep. 1, 2009, and incorporates such provisional application by reference into this disclosure as if fully set out at this point.

BACKGROUND OF THE INVENTION

This invention relates to a wireless audio system for transmitting live performance audio from a user and receiving intercom audio which is provided to the live performer. More specifically, the live performance audio and intercom audio is transmitted and received in digital form.

FIELD OF THE INVENTION

Broadcast television and video regularly relies on wireless microphones for the television personalities and newscasters while on camera. The same is true for musical and theatrical performances. These existing art wireless microphones allow these individuals to move from position to position without cables or away from hardwired news desks. Modern wireless microphone technology now offers performance with audio and dynamic range equivalent to using a cord. More commonly known as a Radio Microphone, there are many different standards, frequencies and transmission technologies used to replace the microphone's cable connection and make it into a wireless microphone. They can transmit, for example, in radio waves using UHF or VHF frequencies, FM, AM, or various digital modulation schemes. Some low cost models use infrared light. Infrared microphones require a direct line of sight between the microphone and the receiver, while costlier radio frequency models do not.

Some models operate on a single fixed frequency, but the more advanced models operate on a user selectable frequency to avoid interference, and allow the use of several microphones at the same time.

However there is a limited band in which the existing art microphones may operate, some new models can have up to 108 different microphones operating simultaneously. However, allowing more microphones to operate at the same time increases the cost. That is one reason for such large price differences between different series of wireless systems. Intermodulation (IM) is a major problem when operating multiple systems in one location. IM occurs when two or more RF signals mix in a non-linear circuit, such as an oscillator or mixer. When this occurs, predictable combinations of these frequencies can occur. Outside radio interference and radio frequency licensing can also be negative issues with professional wireless systems as well. A mixing booth can adjust the volume to the mixer but if the gain between the microphone and the transmitter is too great the signal may clip and the mixer will not be able to correct this. Additionally, batteries cannot be monitored from the control booth, only by the performer looking at indicator lights on a wireless mic.

In wireless systems there is an enormous amount of effort spent in analyzing the spectrum use, as much by others as by the primary user during the production of special events on location. Certain frequencies are used by cameras, others by microphones, a different set by intercoms, data systems, and they are not set. Just when a technician has mapped all of the radio spectrum being used another technician in the area turns on a radio and the process continues, even into a live production when the interference could be critical. Different company's equipment use different frequencies and the real possibility of overlap and subsequent interference exists.

Another issue facing users of wireless system is the reallocation of spectrum. Recently, for example, the FCC reallocated spectrum formerly used for wireless microphones, rendering many thousands of wireless microphones useless and obsolete.

Television commentator and news anchor situations also require a way for the director of a broadcast to speak back to the on-air talent to direct or cue them verbally. Traditionally the microphone transmitters are separate from the Interruptible feedback or interruptible foldback (IFB) systems used in broadcasting and motion picture production for crew communication, audio monitoring and cueing. The IFB is a special intercom circuit that consists of a program feed sent to an earpiece worn by talent via a wire, telephone, or radio receiver (audio that is being "fed back" to talent) that can be interrupted and replaced by a television producer's or director's intercom microphone. On a television news program for example, a producer can talk to the news anchors, to tell them when they are live on the air and when to begin reading off the script on the teleprompter or cue cards.

In electronic news gathering (ENG), the IFB can be sent through the station's MTS PRO channel during live remote broadcasts, or through some other return link in a broadcast auxiliary service. Program audio sent through the IFB, in this configuration, is in most cases a mix-minus; the complete mix of program audio minus certain elements. Because of the physics of electronics, all signals will suffer a time delay as they travel through a wire, or during the conversion to radio frequency and then back to electronic audio, or in the conversion from analogue to digital signal and back again to the analogue realm. Certain audio elements that originate remotely from the mix point will be eliminated (minus-ed) from the mix sent back to the remote site to avoid an undesirable echo. For example, a correspondent in Baghdad connects to the bureau in New York via satellite TV backhaul. The bureau in New York broadcasts the program including the Baghdad element. The Baghdad signal is subtracted from the IFB feed to Baghdad to eliminate an echo that would occur because the signal travels so great a distance first up to the satellite then down to Earth (Baghdad to New York) then back up the satellite and then down to Earth (New York to Baghdad). Musicians sometime use a private IFB to hear their own voice to stay on key or maintain the lyrics in an environment of loud music background.

Occasionally, noise on the existing art IFB can be so annoying that a reporter may casually remove the earpiece from his or her ear while on the air. This noise may be caused by radio interference or another equipment problem. In the case where a normal IFB receiver fails or is unavailable, reporters have been known to use mobile phones to provide an IFB circuit instead.

Noise is the primary enemy of sound recording engineers and it can enter the analog signal at almost any point and through almost any of the hardware. Cables are one of the more notorious, variable, and unpredictable of points that noise enters but amplifiers, connectors and power supplies are almost as bad. What is needed is a non-analog, a digital means of taking audio information from a microphone and keeping it digital all of the way through the process to broadcast and reception by the listener. Much time is spent ringing out the analog audio cables in the pre-production stage of an audio event, judging each cable for the presence or lack of noise, the engineer picking the best of the bunch or simply having to discard the worst.

There has been some change to digital systems in recent years to avoid the pitfalls of analog noise but the distance or length of wires of those technologies is limited in most cases. These schemes are meant mostly to eliminate analog noise in the small confines and distance of a recording studio not over the distance or size of a large studio, theater, music concert, or sporting event. Alesis Digital Audio Tape or ADAT, a digital system first introduced in 1991, was used for simultaneously recording eight tracks of digital audio at once, onto Super VHS magnetic tape—a tape format similar to that used by consumer VCRs. Greater numbers of audio tracks could be recorded by synchronizing several ADAT machines together. Later generations record at two sample rates, the 44.1 kHz and 48 kHz rates commonplace in the audio industry but the original and most wide spread speed of 44.1 kHz comes from the horizontal scan rate of VHS and consequently shows its age. An even older digital scheme is the Musical Instrument Digital Interface, MIDI is an industry-standard protocol defined in 1982 that enables electronic musical instruments such as keyboard controllers, computers, and other electronic equipment to communicate, control, and synchronize with each other. MIDI allows computers, synthesizers, MIDI controllers, sound cards, samplers and drum machines to control one another, and to exchange system data. MIDI does not transmit an audio signal or media—it transmits "event messages" such as the pitch and intensity of musical notes to play, control signals for parameters such as volume, vibrato and panning, cues, and clock signals to set the tempo.

Presently many television stations have more than one network association and consequently multiple news sets with multiple anchors cued up in close proximity all at once. Generally the existing art microphone transmitter and IFB receiver for all of these individual newscasters are separate units with separate batteries and separate housings. There are often times a dozen microphones and a dozen IFBs operating on a given newscast. In addition to the obvious needs there are likely several hot spares waiting in case there is an equipment or battery failure. Each microphone requires a transmitter and it requires a separate receiver, and each IFB receiver requires a separate transmitter. All of these individual components need their audio signals to be patched together in a mixing board arrangement in order to function usefully. Unfortunately in the present business environment television stations are cutting back on production personnel in order to lower costs and the separate position of sound mixer is one of the first to go. This vanishing position is often moved over to the responsibility of the teleprompter operator who is operating a computer that is sending the text to the newscasters. Operating a computer and a physically large mixing board at the same time is a difficult proposition. Even if the mixing board is operated by a computer interface the labyrinth of wires required presents problems that are difficult to solve in real time on a live broadcast.

What is needed is a wireless microphone and an IFB in one package and the ability to use only one receiver and transmitter at the mixing board. A solution like this would also benefit from the ability to work on frequencies that do not require licenses and that also allow many more audio channels than existing art systems do. Furthermore such a system would benefit greatly if gain to the microphone could be controlled remotely as to not clip. A microphone's battery that could be monitored remotely would also be of great benefit.

SUMMARY OF THE INVENTION

The wireless audio system of the present disclosure uses the 802.11 protocols or Wi-Fi as a transmission medium. Both microphone transmission and IFB functions will be digitized in order to be transmitted. Ideally a 24 bit ADC and DAC would be used which would raise the quality beyond what is currently available with VHF systems. This system would also allow for stereo both directions if required and which is not available in existing art systems. The use of Wi-Fi in the inventive wireless audio system would allow dozens of mics and IFBs with only one Wi-Fi receiver at the mixing board. This common transceiver could be based in a laptop computer which would be the mixing board as well as serve other functions such as a teleprompter controller. The inventive wireless audio system would have both microphone transmitter and IFB receiver in one device so there needs to be only one battery. Because the inventive wireless audio system uses Wi-Fi the transmitter would use less power than many existing art designs and would have a long battery life. The inventive wireless audio system would be digital so battery levels could be transmitted back to the mixing board operator and the mixing board operator could control the mics gain remotely both using the same wireless channel as the audio programs. The inventive wireless audio system based on a Wi-Fi transceiver would also be much less expensive to manufacture and maintain than existing art systems.

The inventive wireless microphone/IFB would also have several other useful features, one being a simple and easy to use synch function. Where several groups of wireless microphones would be stored in a common area they would be subject to being mixed and mistaken for each other. The inventive wireless microphone/IFB should have a button that is pressed at the same time as a button on an adjacent unit they will automatically find each other and sync to each other at the IP level and forsake previous sync partners. Any time they are turned on and operational they immediately search for their mate and connect. An additional enhancement to the inventive wireless microphone/IFB would be for it to have a display that could show functions and information such as received signal strength, volume level, MAC address, battery level, earphone level, connection status, to mention a few.

Another aspect of the IP based microphone of the present disclosure is an IP based hardwired microphone interface. It would ideally be powered by "power over Ethernet" (POE) and the interface in turn would power a standard existing art analog microphone using a standard analog microphone connector. It would use the same sync feature as the inventive wireless microphone mentioned above, but rather than connecting wirelessly, it would connect by searching the router that it was connected to, looking for its synced receiver. Ideally it would also have a display that would show connection status and its MAC address to aid in debugging and organizing especially when used simultaneously with many other similar interfaces.

The speed at which the inventive microphones will be widely adopted will be slower if there isn't sufficient support equipment of a similar technology or a way to adapt between the new inventive technologies and older and well established technologies during a crossover period. There is a great deal of high quality and expensive equipment that is instantly antiquated by the inventive devices presented here even though this equipment may have been recently purchased and consequently some users may have a problem in abandoning the equipment in the short term. An additional inventive data adapter would somewhat solve this problem by creating a bridge, enabling existing ADAT based hardware to work with IP based microphones, also an inventive MIDI to IP adapter would allow similar results for MIDI devices. These two inventive devices coupled with existing digital mixers would allow a near complete digital solution from microphone to broadcast and allow little or no place for noise to develop or enter the audio channel even when captured half way around the world.

An additional inventive device would be an IP based mixer where the data comes in and leaves as IP which would be the best of all possibilities. Many of the digital mixers presently available rely too heavily on computer screens and are not acceptable to the true craftsmen of their trade. They have no ability to communicate with the internet, they are simply digital. What is needed is an IP based mixer with a full set of knobs corresponding to the many channels, EQ adjustments, cross fade channels, and multiple inputs. The inventive mixing board would also have VU meters that have weighting in order to best replicate mechanical meters as that is the preferred method of observing sound levels. The inventive mixing board would have a small electronic display at the input end of every given channel to help identify and label it as is done in the existing art analog world inputs with labeled bits of tape and handwritten notes. The inventive device should also have analog inputs and outputs for backwards compatibility to existing technologies. Routers located around a venue could take the IP based microphone inputs and deliver them all as a single Ethernet cable to the IP mixer rather than the jungle of wires required in existing art.

This type of inventive mixer would also allow mixing to be accomplished in maximum digital fidelity off-site. That is to say a sound mixing engineer could be actually working in Australia while the recording artists would be performing in a studio in North America. In the case of live events where signal latency is an issue, the sound mixing engineer in Australia could be operating a mixing board remotely and yet be listening to a maximum fidelity feed, though slightly delayed by propagation delays but the mixing adjustments would be occurring on his mixing board that is linked to the actual mixing board located at the live event and is the one working directly and in real time with the live input signals. This would be especially useful for television networks when they are covering sporting events in far flung cities as they could use a headquarters based in-house engineer for consistency rather than hiring locally at the venue where that operator might not perform in a way that the network usually does. There would also be huge travel and lodging savings involved in using such an inventive set of devices in this way.

Existing fiber-optic to Ethernet adapters would also compliment the inventive devices in their widespread adoption as most main stream broadcasting is done with fiber optic cable from the mixing booth or truck.

The transceiver of the present disclosure includes generally, a codec, microcontroller, and radio. The codec includes an analog to digital converter for receiving an electrical representation of a first audio program and converting it to a first digital audio signal; a digital to analog converter for receiving a second digital audio signal and converting it to a second electrical representation of a second audio program; and, a control function for managing at least one characteristic of the analog to digital converter or the digital to analog converter. The microcontroller is in electrical communication with the codec: for receiving the first digital audio signal from the codec and packetizing it into a first packet for transmission over a TCP/IP network; for receiving a second packet from said TCP/IP network and converting it into the second digital audio signal and sending it to the codec; and for receiving control signals from the TCP/IP network. The radio is in electrical communication with the microcontroller for connection to a TCP/IP network to transmit the first packet to the network and receive the second packet from the network.

In a basic embodiment the digital to analog converter may be omitted such that packetized information is transmitted from the microprocessor through the network via the radio but no audio information received back. Control information could, in many formats, be used in digital form by the codec.

DETAILED DESCRIPTION OF THE PREFERRED EMBODIMENTS

Figure 1:
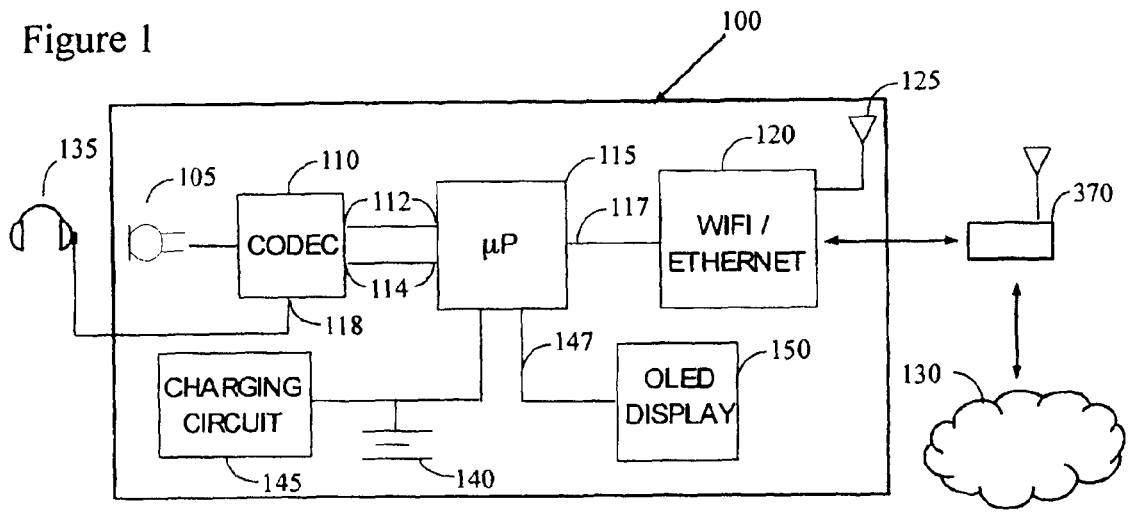
FIG. 1 depicts a schematic representative of the IP based microphone and intercom of the present disclosure
Figure 2:
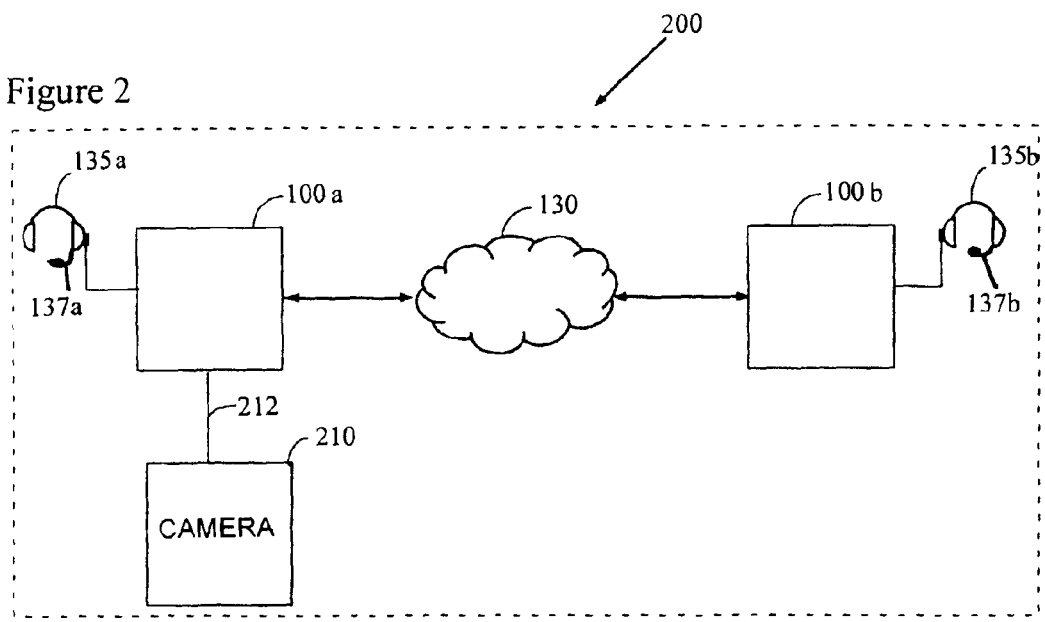
FIG. 2 depicts a schematic representation of one preferred system using two of the IP based microphone and intercom of the present disclosure.

Referring now to the drawings wherein the reference numbers indicate the same parts throughout the several views, there is provided a bidirectional wireless microphone station that communicates audio data via an Internet protocol ("IP").

Figure 3:
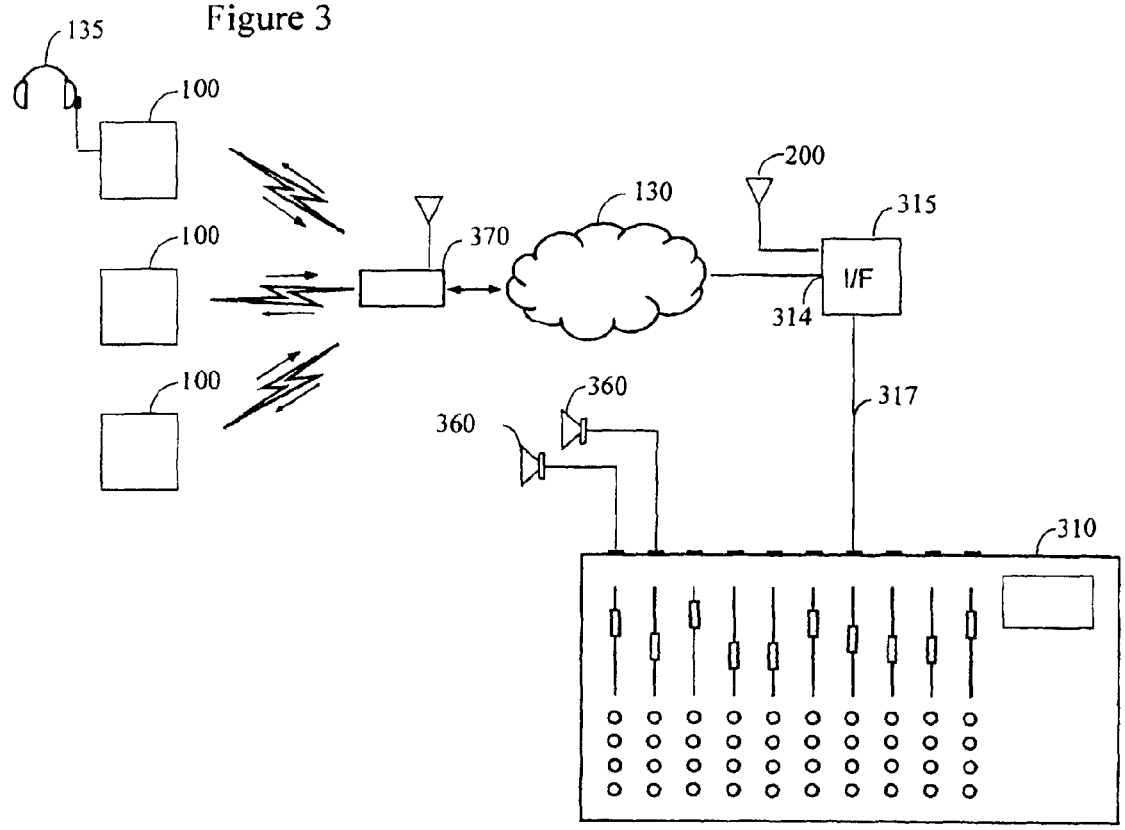
FIG. 3 depicts a schematic representation of a second preferred system using multiple IP based microphones and intercoms of the present disclosure.

Turning first to FIG. 3, there is provided a preferred bidirectional wireless microphone embodiment 100 suitable for use with the instant invention. In the preferred arrangement, the instant microphone 100 will sense audio information as is conventionally done with, for example, a condenser-type microphone but, instead of transmitting the audio information by analog means as is conventionally done (e.g., via a microphone cable or wirelessly via an RF signal), the instant invention will send packetized audio via IP (either wired or wirelessly) from the microphone 100 to a remote terminus (e.g., a mixing board 310). Additionally, in some preferred embodiments (e.g., FIG. 1) the instant invention will be configured to receive packetized audio from a remote source (e.g., from mixing board 310) and will decode and pass that audio information back to a user of the microphone 100.

In operation and as is generally indicated in FIG. 3, in a preferred embodiment one or more microphones 100 that are designed according to the instant invention will be brought into electronic communication with a wireless or other access point or router 370. Preferably, when each microphone 100 is first activated it will request an IP number via DHCP as an initial step to establishing communication with a remote receiver for the audio that will be sensed thereby.

Next, a search will preferably be conducted for those networks that it has already been connected to in the past and/or that can be currently sensed by the microphone 100. Information such as networks previously utilized (and the passwords of same, if any) might be stored, by way of example only, in some amount of onboard non-volatile memory that has been provided for that purpose. Preferably, if there are multiple networks available a list will be presented to the user using an integral OLED display screen 150.

After joining a network, the microphone 100 will preferably begin a search for a recipient of the forthcoming audio transmission. Preferably, this will be done by, for example, broadcasting a signal that indicates its availability for communications according to methods well known to those of ordinary skill in the art. For example, the instant microphone 100 might broadcast its availability (and, e.g., its MAC and/or IP addresses) via a packet to every device that communicates on a 192.168.1.xxx subnet.

If a recipient is available and willing (e.g., mixer board 310) a confirmation will be sent and a connection will be established between it and the microphone 100 via the cloud/Internet 130. Note that the cloud 130 might be a WAN, a LAN, or some other sort of network as those terms are known and used in the art. In the preferred arrangement, the instant invention 100 will utilize UDP for announcing and TCP/IP for audio transmission. Note that the recipient of the audio transmission might be located locally or at some site distant from the subject of the recording.

After a connection has been established, the instant microphone 100 will begin to transmit packetized audio information to the recipient/mixer board 310 as is described in at greater length below. Additionally, in some instances an individual on the recipient end might wish to transmit audio or other information back to the microphone 100. This would be useful where, for example, the on-screen talent is being prompted from a control room during an interview. In such a case, the returning audio information might be provided to the user via an optional set of headphones 135. The interface 315 will be discussed in greater detail below in connection with FIG. 4.

Turning now to the details of a preferred embodiment of the instant invention 100, in FIG. 1 an inventive microphone 100 will preferably contain a condenser or other conventional audio microphone component 105 that is in electronic communication with a codec 110 and various other hardware components as indicated in this figure. To prevent intrusion of noise, it is preferred that the distance between the microphone component 105 and the codec 110 be relatively short, e.g., on the order of a few inches.

The codec 110 will preferably receive the analog audio signal from microphone component 105 and, among other things, convert it to a streaming digital audio stream via an A/D converter for transmission via a high speed serial interface 112 to a microprocessor 115. The company Analog Devices makes one codec that would be suitable for use with this embodiment of the instant invention.

Note that one of the preferred outputs 118 from the codec 110 will be connectable to a set of headphones 135. One use for this signal path would be to provide the microphone user real time audio feedback. This sort of functionality is typically required by performers to allow them to monitor their own voice and/or instrument during a performance or broadcast. Preferably, the codec 110 will handle the digital to analog conversion required to send an audio signal from the microphone component 105 to analog headphones as will be described hereinafter. Additionally, and preferably, the codec 110 will digitize the audio at a rate of 48 kHz, 24 bits per sample. The codec 110 will preferably be connected to the microprocessor 115 via a high-speed serial interface 112 over which communications are conduced using a protocol such as AES, etc. Bus 114 might be a bi-directional SPI (i.e. serial peripheral interface), I²C, etc., bus that can be used to send commands and control information to the codec 110 and receive status information therefrom. The output from the codec 110 (via bus 112) will preferably be 24 bit streaming audio that is sampled at 48 khz, although certainly other combinations of bit depth/sample rate are possible.

Microprocessor 115 will preferably receive the streaming audio information from the codec 110 and transmit it onward via another high-speed connection 117 which would preferably be another SPI connection although other sorts of connections (e.g., parallel interface) are certainly possible.

Preferably within the microprocessor the streaming audio from the codec 110 will be converted to packetized audio, i.e., audio that is suitable for transmission to the receiver via TCP/IP. The algorithm used to perform this conversion will be discussed at greater length below. Additionally, packetized audio that is received from the Ethernet module 120 will be converted by the microprocessor 115 to streaming audio for transmission to the codec 110 and then on to the user, preferably via headphones 135.

Additionally, it is anticipated that the microprocessor 115 will control a display device 150 via electrical connection 147. Preferably, the display device 150 which will be an OLED or similar display will allow the user to interact with the microprocessor 115 and control the operations of the microphone 100.

Next in the signal chain will preferably be a Wi-Fi/Ethernet adaptor 120. This adaptor might utilize an antenna 125 for wireless communications or it might interface with a standard CAT 5 Ethernet cable to obtain access to the Internet 130, typically via wireless (or other) router 370. Those of ordinary skill in the art will recognize that other network communication protocols are available.

Additionally, the microphone will preferably contain a power source 140 and will have a charging circuit 145 in the event that the microphone utilizes rechargeable batteries as its power source 140.

Returning now to FIG. 3, preferably one or more microphones 100 will be in use at a given time. Each will communicate with the Cloud 130 which might be a local area network ("LAN"), a wide area network ("WAN"), etc. The signals from the microphones 100 will be received preferably by an interface module 315 which will obviously be configured differently depending upon whether the microphones 100 are in wireless communication with the Internet 130 or wired communications. In any case, the interface module 315 will preferably have an antenna 313 and/or an Ethernet port 314 for receiving signals from the remotely-positioned microphones 100. The interface module 315 will preferably be analog communication with a conventional mixer board 310 via one or more analog outputs 317. That being said, those of ordinary skill in the art will recognize that, in some cases, the communications between the interface module 315 and the mixer board 310 might be digital where, for example, the mixer 310 is actually embodied in the software within a computer as is often done in the audio industry. That being said, the main function of the interface module 315 is to receive the packetized audio information from one or more microphones 100 and transmit that information on to a mixer or other audio terminal point. Preferably, though, the device that receives the analog or digital audio information from the interface module 315 will be a mixer of some sort that has the normal allotment of sliders and pots to control the amplitude of the audio signal and the response to the various frequency demands. Additionally, there may be audio outputs that are designed to provide a monitor signal to the sound engineer and/or to a listening audience. In some cases, the output is relieved to speakers 360. In other cases, a mono or stereo audio output that is comprised of the mixed inputs from microphones 100 and/or additional audio sources will be mixed together and transmitted on for broadcast via television, radio, webcast, etc. Of course, the mixer board 310 might contain additional inputs which might be fed by local microphones, etc.

Figure 4:
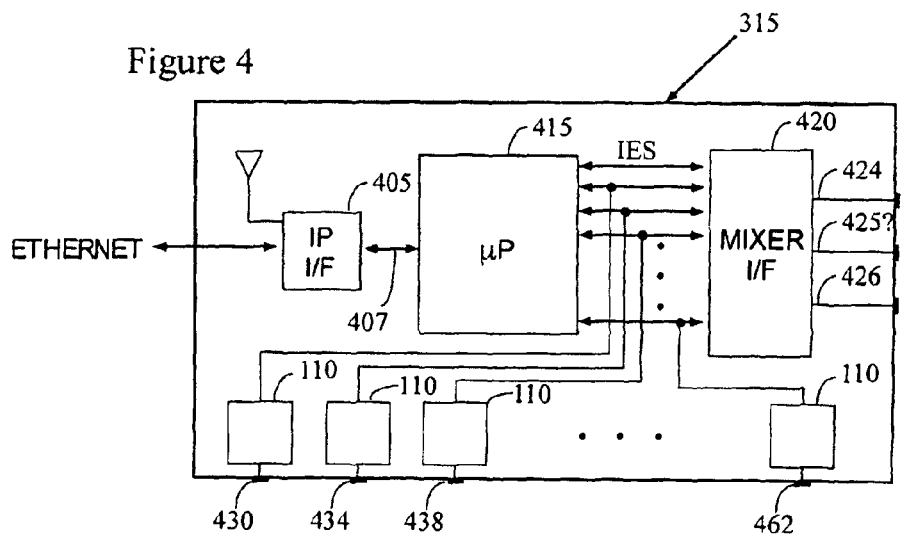
FIG. 4 depicts a schematic representation of an interface for receiving packetized digital audio signals from multiple IP based microprocessor systems separating and delivering audio signals to the mixer board as shown in FIG. 3.

FIG. 4 contains an expanded view of the interface device 315. As can be seen, the interface 315 preferably contains packetized audio information that is received from a remote microphone via the Ethernet using either a wired or wireless link. This IP interface 405 will accept the packetized audio data via an Ethernet (wired or wireless) link and transmit that information preferably by an interface portal such as SPI or other high speed serial connection. The microprocessor 415 will receive the packetized audio information from the IP interface 405 and process it further as is described below. The microprocessor 415 will preferably be in electronic communication with a module that is for purposes of illustration only referred to as a mixer interface 420. The communication between the microprocessor 415 and the mixture 420 will preferably be via an IES or other standard protocol.

As is generally indicated in this figure, in the preferred embodiment the microprocessor 415 will have a number of output pins which will be placed in electronic communication with a mixer interface 420. Preferably the communications protocol will be AES so that each connection 470 will carry a separate audio channel (e.g., if multiple microphones 100 are in use simultaneously). Of course, those of ordinary skill in the art will recognize that other transmission protocols (e.g., EtherSound) can accommodate multiple channels of audio over a single bus and, in the event that sort of protocol is used, only a single connection would be necessary.

In this preferred embodiment, the digital audio from the microprocessor 415 is transmitted to the mixer interface and subsequently on to digital outputs 424, 425, and 426. Additionally, in some preferred embodiments the digital audio will also be routed to codecs 110 which will preferably be of the same type as that located in the microphone 100, although that certainly is not a requirement. In the embodiment of FIG. 4, each codec 110 will be configured to accept as input one of the digital audio output channels 470. Of course, the codec 110 will convert digital audio to analog as has been discussed previously in connection with the microphone 100. Preferably, each of the codecs 110 will have an analog port or connection (430, 434, 438, ..., 462) associated therewith. Of critical importance to the operation of the instant invention is maintaining an appropriate output sample rate. That is, since audio will be arriving at the microphone 100 (and, similarly at the receiver 310) via IP packets there is no direct clock connection that can be used to keep the source and receiver in sync. Absent such a clock connection the instant invention utilizes an ad hoc procedure for maintaining the input sample rate and output sample rate in synchronization.

With reference to FIG. 1, codec 110 preferably has a number of control functions which are programmable via SPI bus 114. By way of example and not limitation, such features might include selective input audio routing for one or more microphones, one or more line level inputs, or even the internal digital to analog converter to an input mixer. The output of the input mixer is typically directed to the analog to digital converter. The gain of each input is typically controllable individually. Preferably, codec 110 also includes an output mixer which selectively accepts audio from the sources listed above and directs the outputs to a headphone amplifier and line level audio outputs. Typically each output has independent gain control. Additionally, control features preferably allow adjustment of the sample rate and perhaps filters to eliminate pops, noise, etc.

As will be appreciated by those of ordinary skill in the art, when audio is digitized, a sample clock is used to gather digital samples on a periodic basis. Likewise, when the digitized audio is converted back to analog, a sample clock regulates the conversion. If the input sample clock and output sample clock are remote, either the original clock must be encoded with the data or the two clocks will almost certainly operate at slightly different frequencies. If operating at slightly different frequencies, the output will either develop a deficit of data if it has the faster clock or stack up surplus data if it has the slower clock. Either condition is known as "skew." Since packetizing data is inconsistent with encoding a clock in the data, a scheme for de-skewing the data, due to the nature of asynchronous clocks, must be employed.

Figure 5:
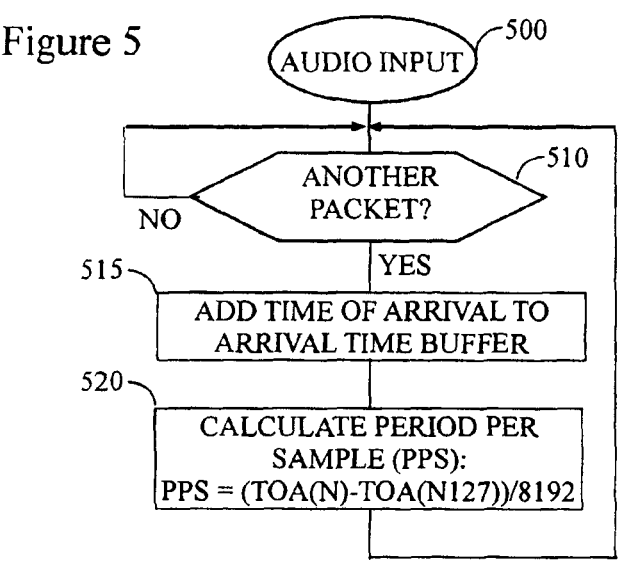
FIG. 5 depicts a flow chart for calculating an accurate period per sample for a series of inbound audio packets.
Figure 6:
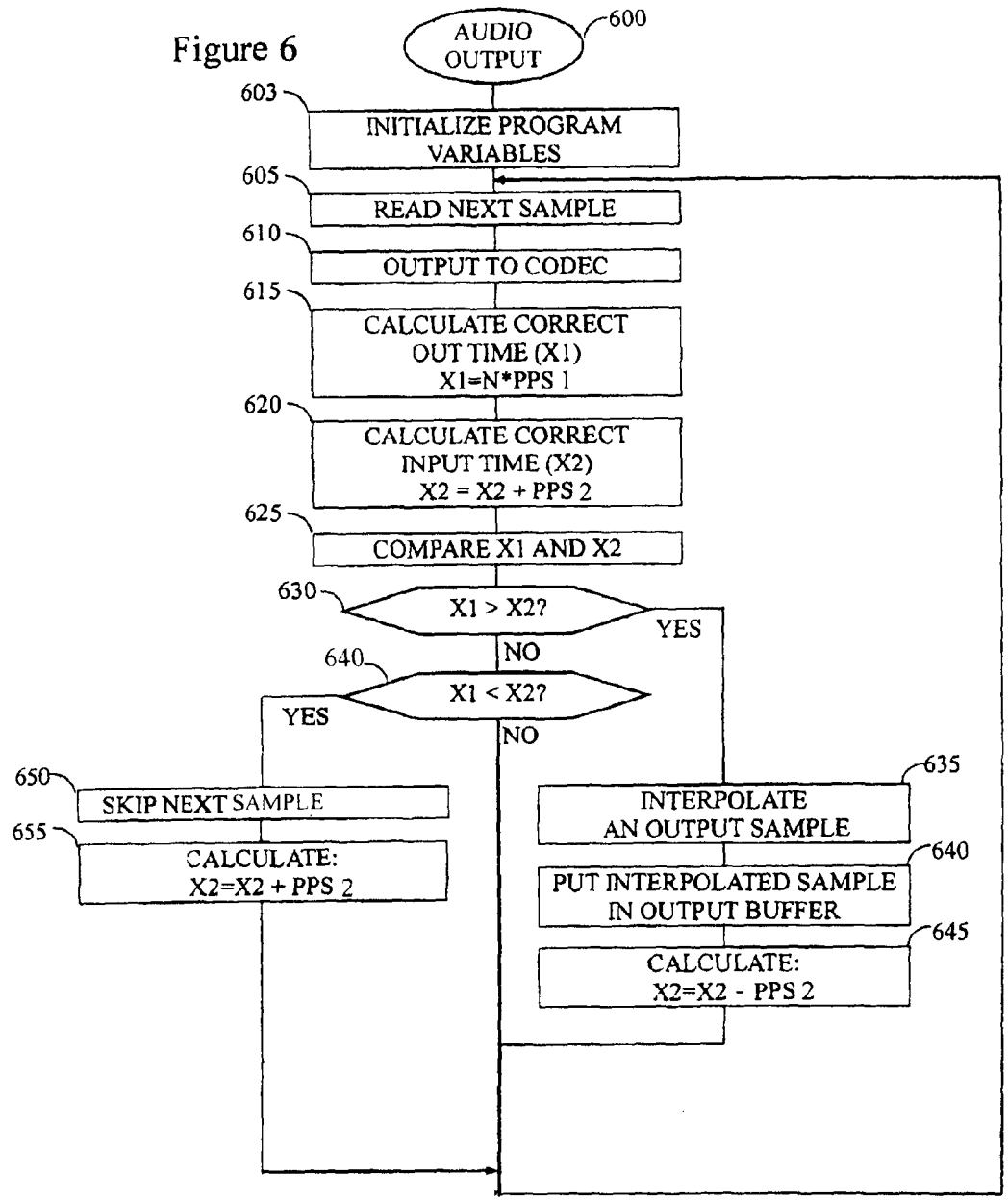
FIG. 6 depicts a flow chart applying the period per sample calculation of FIG. 5 to adjust an audio buffer to account for differences in the remote sample clock and the local sample clock.

Turning then to FIGS. 5 and 6, a relatively simple method for de-skewing the output data is shown. First, as audio packets are received at steps 500 and 510, the time of arrival for each packet is logged at step 515. After a sufficient number of packets are received, for example, and not by way of limitation, 128, an average period per sample can be calculated by subtracting the time of arrival of the first packet from the time of arrival of the last packet and then dividing by the total number of samples in the 128 packets, as in step 520. Obviously, the process can then be repeated for each subsequently received packet.

Once a period per sample has been calculated, the data may be manipulated pursuant to the flow chart of FIG. 6. The audio output routine with de-skew 600 starts by initializing program variable at 603. This is essentially zeroing an input timer and an output timer. As packets are received, the data is saved in a buffer, preferably at least two packets in length but not so long as to introduce unacceptable delay. Data is then pulled out of the buffer one sample at a time as driven by the output sample clock at step 605 and delivered to the codec at 610 where it is converted to an analog signal. Next, the actual output time is calculated by multiplying the total number of samples (n) times the period of the output sample clock, step 615. Likewise, the current input sample time is calculated by adding the period per sample calculated in FIG. 5 to a running total (×2) in step 620. At step 625, the input time is compared to the output time at 630, if the output time is greater than the input time, an extra sample is added to the buffer which is interpolated between the current value immediately written to the codec and the next valve on the buffer steps 635 and 640. The output time is then adjusted downward by one sample time.

If, instead, the output time is less than the input time at step 640, the next sample in the buffer is thrown away at step 650 and the input time (×2) is adjusted by adding an addition sample period, step 655.

It should be noted that, if the input time is equal to the output time, no adjustments are necessary.

Figure 7:
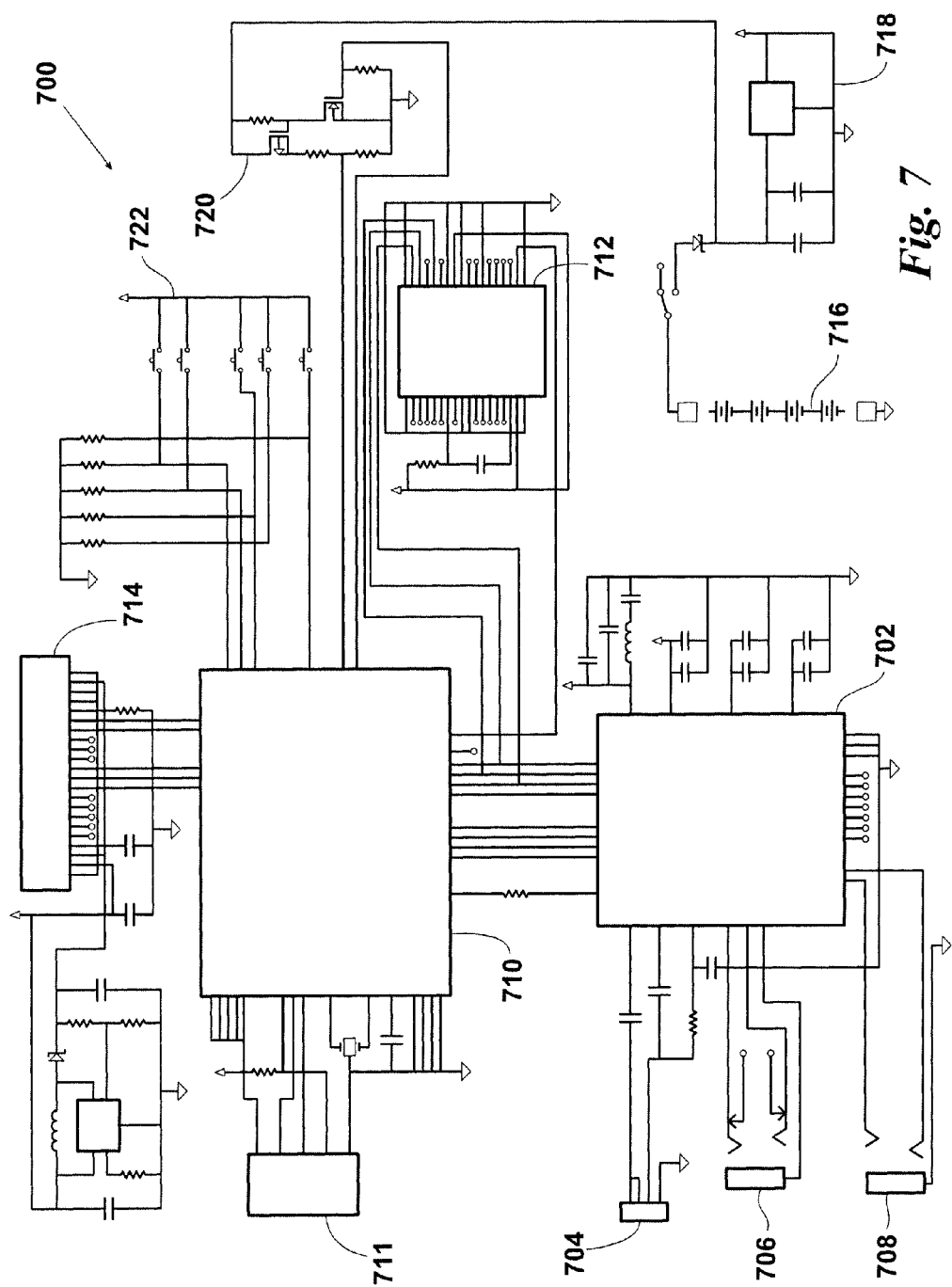
FIG. 7 depicts a detailed schematic representation of a preferred embodiment of the IP based microphone and intercom of the present disclosure.

Reference is next made to FIG. 7 which is a detailed schematic of a preferred embodiment of the IP based microphone and intercom 700 of the present disclosure. IP based microphone 700 includes codec 702. Codec 702 is a Model ADAU1361 codec available from Analog Devices, One Technology Way, P.O. Box 9106, Norwood, Mass. 02062-9106, USA. Codec 702 is capable of receiving an electrical representation of an audio program from a microphone 704. Microphone 704 receives a live audio program and converts it to an electrical representation of the live audio program. IP based microphone 700 may include microphone 704 internally or microphone 704 could be external.

Codec 702 includes an analog to digital converter for converting the analog electrical representation of the live audio program to a first digital audio signal. Code 702 also includes, in the preferred embodiment, a digital to analog converter for receiving a second digital audio signal, such as intercom signal containing information and/or instructions to the live performer, and converting this second digital audio signal to a second electrical representation of an audio program. This second representation of an audio program may then be transmitted from codec 702 to a headphone 706. Headphone 706 converts the second electrical representation of an audio signal to an audio program which may be heard by the live performer wearing headphone 706. Headphone 706 may be any device known in the art and may be either wired to codec 702 or wireless.

Codec 702 may also receive numerous digital audio signals from several wireless microphones such as 700 of the present disclosure and output audio, either digital audio or analog audio as required, through audio line out 708 to an external device such as a camera, stereo, microphone mixer or any other such device known in the art.

Codec 702 is in electrical communication with microprocessor 710. Microprocessor 710 is, in the preferred embodiment, a high performance 16-bit digital signal controller Model dsPIC33FJ128GP206 available commercially from Microchip Technology, Inc., 2355 West Chandler Blvd., Chandler, Ariz. 85224-6199. Microprocessor 710 receives the first digital audio signal from codec 702 and packetizes the first digital audio signal for transmission over a TCP/IP network. Microprocessor 710 may also receive a second packet(s) from the TCP/IP network (through radio 712) and convert the second packet(s) into a second digital audio signal. The second digital audio signal is then transmitted to the codec and processed as described above.

Microprocessor 710 may also receive control signal packet(s) from the TCP/IP network (through radio 712). The control signal packet(s) are transmitted to the codec and processed as described above. Microprocessor 710 may also include a programming header 711 as is known in the art.

IP based microphone and intercom 700 includes a radio 712. Radio 712 is preferably a wi-fi interface Model ZG2101MCC3 wi-fi module available from Zerog Wireless, 255 San Geronimo Way, Sunnyvale, Calif. 94085. Radio 712 is connected to a network, and preferably a wireless TCP/IP network. Radio 712 transmits the first packet(s) over the TCP/IP network preferably to a second microphone and intercom 700 for output to a microphone mixer or camera, etc. and described above.

Radio 712 also receives the second packet(s) over the TCP/IP network from a second microphone and intercom 700 which may include intercom audio for the performer such as a news/sports director, audio engineer, or the like. The second, intercom, packets are transmitted from radio 712 to microprocessor 710 for processing as described above.

Radio 712 may also receive control packets over the TCP/IP network from a second microphone and intercom 700 which may be connected to a mixer board or like interface. The control packets may include control information for the analog to digital converter or the digital to analog converter. This control information could include sampling rates, input signal paths, microphone inputs, line inputs, ADC full-scale level, ADC volume control, high-pass filter, microphone bias, automatic level control (ALC) and ALC parameters, output signal paths, jack detection, line outputs, pop-and-click suppression, playback power management and other such control parameters (information) known in the art. The control packets are transferred from radio 712 to microprocessor 710 for conversion into a control signal. The control signals are transferred from microprocessor 710 to codec 702 for use by codec 702. Such control information is a part of the known function of codec 702 and particularly the model ADAU1361 codec from Analog Devices.

IP based microphone and intercom 700 also preferably includes display 714. Display 714 is in a preferred embodiment, a 96×64 full color graphic OLED module, model CFAL9664B-F-B1 available from Crystalfontz America, Inc., 12412 East Saltese Ave., Spokane Valley, Wash. 99216-0357. In the preferred embodiment, display 714 is an LCD screen in electrical communication with microprocessor 710. It is contemplated that packetized message information may be received by radio 712 over the TCP/IP network which is converted into a digital signal by microprocessor 710 to be displayed, such as in alphanumeric form, on display 714. Other information may also be displayed.

IP based microphone and intercom 700 also preferably includes a battery 716 to provide power. In addition, a voltage regulator 718 is preferably included to regulate the electrical voltage in IP based microphone and intercom 700. A circuit 720 for reading battery voltage is provided which provides battery voltage information to display 714. Circuit 720 may preferably be provided with an on/off circuit so as to preserve battery power. A circuit 722 may be included to provide further function to manipulate menus available and to control the volume, etc.

Note that although the devices 115, 415, etc. utilized in the instant invention are referred to as microprocessors herein, that term was chosen for purposes of clarity in disclosing the instant invention only and not out of any desire to limit that device to traditional "microprocessors." Those of ordinary skill in the art will recognize that there are many active/programmable devices that could be utilized in the role of the device 115 including, of course, conventional microprocessors, microcontrollers, programmable logic devices ("PLD") including, without limitation, gate arrays, FPGA's (i.e., field programmable gate arrays), CPLD's (i.e., complex PLD's), EPLD's (i.e., erasable PLD's), SPLD's (i.e., simple PLD's), PAL's (programmable array logic), FPLA's (i.e., field programmable logic array), FPLS (i.e., fuse programmable logic sequencers), GAL (i.e., generic array logic), PLA (i.e., programmable logic array), FPAA (i.e., field programmable analog array), PsoC (i.e., programmable system-on-chip), SoC (i.e., system-on-chip), CsoC (i.e., configurable system-on-chip), ASIC (i.e., application specific integrated chip), etc., as those acronyms and their associated devices are known and used in the art. Further, those of ordinary skill in the art will recognize that many of these sorts of devices contain microprocessors integral thereto. Additionally, it is known to utilize multiple of the foregoing in tandem to function as a programmable device. Thus, for purposes of the instant disclosure the terms "processor," "microprocessor" and "CPU" (i.e., central processing unit) should be interpreted to take the broadest possible meaning herein, and it should be noted that such meaning is intended to include one or more programmable or other devices of the general sort described above.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A transceiver for digitally transmitting live performance audio and receiving digital audio, comprising:
   (a) A codec comprising:
       (i) an analog to digital converter for receiving an electrical representation of a live performance audio program from a performer and converting said electrical representation to a first digital audio signal;
       (ii) a digital to analog converter for receiving a second digital audio signal and converting said second digital audio signal to a second electrical representation of an IFB cue for delivery to said performer;
       (iii) a control function for managing at least one characteristic of said analog to digital converter or said digital to analog converter;
   (b) a microcontroller in electrical communication with said codec: for receiving said first digital audio signal from said codec and packetizing said first digital audio signal into a first packet for transmission via a Transmission Control Protocol/Internet Protocol (TCP/IP) network; for receiving a second packet from said TCP/IP network and converting said second packet into a said second digital audio signal and sending said second digital audio signal to said codec; and for receiving control signals from said TCP/IP network;
   (c) a radio in electrical communication with said microcontroller for connection to a TCP/IP network to wirelessly transmit said first packet to said TCP/IP network and wirelessly receive said second packet from said network;
   (d) at least one battery for providing electrical power to said codec; said microcontroller and said radio.

2. A transceiver for digitally transmitting live performance audio and receiving digital intercom audio, comprising:
   (a) an analog to digital converter for receiving an electrical representation of a live performance audio program from a performer and converting said electrical representation to a digital audio signal;
   (b) a microcontroller in electrical communication with said analog to digital converter for receiving said digital audio signal and packetizing said digital audio signal into at least one digital audio packet for transmission over a Transmission Control Protocol/Internet Protocol (TCP/IP) network;
   (c) a radio in electrical communication with said microcontroller for connection to said TCP/IP network;
       said radio for wireless transmission of said at least one digital audio packet over said TCP/IP network;
       said radio for wireless reception of at least one digital intercom packet over said TCP/IP network and providing said at least one digital intercom packet to said microcontroller;
   (d) wherein said microcontroller converts said at least one digital intercom packet into a digital intercom audio signal;
   (e) a digital to analog converter in electrical communication with said microcontroller for receiving said digital intercom audio signal from said microcontroller and converting said digital intercom audio signal into an electrical representation of an analog intercom audio signal for delivery to said performer;
   (f) wherein said analog to digital converter includes at least one control function controllable by said microcontroller;
   (g) wherein the transceiver supports real time bidirectional audio feedback.

3. The transceiver of claim 2 wherein at least one of said analog to digital converter and said digital to analog converter is a codec.

4. The transceiver of claim 2 wherein said analog to digital converter and said digital to analog converter are a codec.

5. The transceiver of claim 1 wherein the transceiver supports real time bidirectional audio feedback.

6. The transceiver of claim 2 further including at least one battery for providing electrical power to said analog to digital converter, said microcontroller and said radio.

* * * * *